United States Patent
Dove et al.

[11] Patent Number: 5,469,045
[45] Date of Patent: Nov. 21, 1995

[54] HIGH SPEED POWER FACTOR CONTROLLER

[76] Inventors: Donald C. Dove, 9450 East Ave., T-8, Littlerock, Calif. 93543; Howard D. Kent, 11635 Gerald Ave., Granada Hills, Calif. 91344

[21] Appl. No.: 163,986

[22] Filed: Dec. 7, 1993

[51] Int. Cl.[6] .................................................. G05F 1/70
[52] U.S. Cl. ........................................ 323/211; 323/210
[58] Field of Search .................................. 323/205, 208, 323/209, 210, 211

[56] References Cited

U.S. PATENT DOCUMENTS

| | | | |
|---|---|---|---|
| 4,387,329 | 6/1983 | Harlow | 318/729 |
| 4,426,609 | 1/1984 | Nagy et al. | 318/729 |
| 4,459,528 | 7/1984 | Nola | 318/729 |
| 4,567,424 | 1/1986 | Dobsa et al. | 323/210 |
| 4,581,568 | 4/1986 | Fitzpatrick et al. | 318/729 |
| 4,723,104 | 2/1988 | Rohatyn | 318/813 |
| 4,839,819 | 6/1989 | Begin et al. | 364/483 |
| 4,982,147 | 1/1991 | Lauw | 318/729 |
| 5,010,287 | 4/1991 | Mukai et al. | 318/801 |
| 5,051,685 | 9/1991 | Sink | 323/208 |
| 5,077,512 | 12/1991 | Weber | 318/726 |
| 5,153,489 | 10/1992 | Unsworth et al. | 318/490 |

Primary Examiner—Jeffrey L. Sterrett
Attorney, Agent, or Firm—Poms, Smith, Lande & Rose

[57] ABSTRACT

A microprocessor is coupled to sense the current and voltage in a power phase at a high sampling rate such as two hundred fifty-five (255) times per cycle, and to determine the power factor. The primary of a transformer is coupled across the power lines, and at least two capacitors, forming separate switching paths, are coupled to the secondary of the transformer. High speed switching circuitry under the control of the microprocessor alternately charges and discharges the capacitors, at varying frequencies, to alternately store energy from the power lines when the variable load is returning energy to the power lines, and to supply the stored energy back to the power lines when the variable load is absorbing energy from the power lines. This corrects the power factor since the frequency of the high speed switching circuitry is varied with the varying reactance of the load.

25 Claims, 11 Drawing Sheets

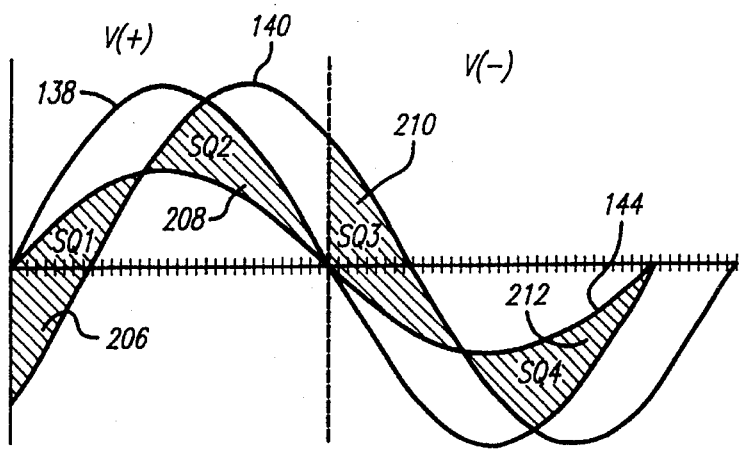

FIG. 6(a)

|  | PRESENT VOLTAGE VALUE V(+) POSITIVE | PRESENT VOLTAGE VALUE V(−) NEGATIVE |
|---|---|---|
| PRESENT TEMPLATE ERROR VALUE 144 GREATER THAN PRESENT CURRENT VALUE 140 | SQ1<br>LOAD IS STORING ENERGY<br>ENERGIZE: PATH 198<br>DISCHARGE: PATH 196 | SQ4<br>LOAD IS STORING ENERGY<br>ENERGIZE: PATH 202<br>DISCHARGE: PATH 200 |
| PRESENT TEMPLATE ERROR VALUE 144 LESS THAN PRESENT CURRENT VALUE 140 | SQ2<br>LOAD IS RETURNING ENERGY<br>ENERGIZE: PATH 198<br>DISCHARGE: PATH 196 | SQ3<br>LOAD IS RETURNING ENERGY<br>ENERGIZE: PATH 200<br>DISCHARGE: PATH 202 |

FIG. 6(b)

HIGH SPEED POWER FACTOR CONTROLLER

BACKGROUND OF THE INVENTION

1. Field of the Invention

The present invention relates to power factor correction in single or polyphase alternating current systems, and, more particularly, to a method and apparatus for effecting near-instantaneous power factor correction in a variable reactive load.

2. Description of the Related Art

Producers and consumers of large amounts of electrical power have long sought to optimize the use of power to avoid energy waste. One way to optimize the use of electrical power is to maximize the power factor associated with a reactive electrical load. A reactive load is one which has inductive or capacitive components. An alternating current power source generally provides a sinusoidal voltage and the load draws a sinusoidal current. In a purely resistive load, the source voltage and source current are in phase and the power factor is equal to one. In an ideal purely reactive load (zero resistance), the source voltage and source current are 90° out of phase, and the power factor is equal to zero. The power factor has a fractional value between zero and one for loads which are a combination of resistive and reactive components. The use of electrical power is optimized when the power factor is equal to one.

The power factor is the ratio of the average power required by the load to the apparent power delivered by the source. The power factor thus indicates the ratio of useable power delivered to the load to the amount of power which must be generated at the source. With a low power factor, substantially more line losses occur relative to the useful power delivered to the load, than with higher power factors approaching unity.

When a load requiring a given average power has a relatively high power factor, the power generator need not supply as much excess power to operate the load properly. When the power factor is low, the generator must supply a relatively large amount of excess power, which is accompanied by higher losses in the power lines. The power factor ranges from zero to one depending on how far out of phase the instantaneous voltage and current are at the load. In equation form, the power factor (PF) is expressed as $PF=\cos(\Theta_v-\Theta_i)$, where $\Theta_v$ is the phase angle of the voltage and $\Theta_i$ is the phase angle of the current at a given time.

A typical industrial load may be a bank of induction motors or other expensive machinery. The load requires a certain amount of average power to operate properly. Usually, an industrial load has an overall reactance which is characterized by resistive and inductive components. The power factor in such a load is said to be lagging, since the current through the load lags behind the voltage applied to the load in such a case. This is termed a lagging power factor. In a capacitive load, the current leads the voltage, resulting in a leading power factor.

The apparent power is the product of the root mean square source voltage and the root mean square source current. The apparent power is normally stated in volt amperes (VA) or kilovolt amperes (kVA) in order to distinguish it from average power, which is measured in watts (W).

A low power factor at the load means that the power company's generators must be capable of delivering more current at constant voltage, and they must also supply power for higher line losses than would be required if the power factor of the load were high. Since high line losses represent energy expended in heat and benefit no one, the power company often will insist that a plant maintain a high power factor, typically 0.90 lagging, and will adjust their rate schedule to penalize users that do not conform to this requirement. However, installations that require large amounts of power have a wide variety of load conditions, which may include loads which vary with time.

For instance, consider a single 25 horsepower walking beam oil pump motor. Such motors are used to drive the "see-saw" type oil pumps commonly seen in many oil fields, which are known as walking beam oil pumps. During one part of the cycle of a walking beam oil pump, a large column of pipe is lifted. The motor consumes a relatively large amount of average power at this point. However, during another portion of the cycle of the walking beam oil pump, the column of pipe is being lowered again. At this point, the motor consumes very little average power. The reactance of the motor changes throughout the cycle as the load varies. Hence, the motor behaves as a variable reactive load, with typical oil pump motors including several pumping cycles per minute.

Variable reactive loads present a problem regarding power factor correction since the power factor varies as the reactance varies. Conventional power factor correction schemes, such as fixed capacitors, suffer from the disadvantages of being large, costly, and effective only for a very narrow range of load variations. During transient conditions such as during motor start-up or during drastic load changes, conventional fixed value power factor correction devices save little or no energy. Furthermore, fixed value power factor correction devices are ineffective whenever the load maintains a reactance value outside the designed correction range.

Other conventional devices have also been proposed to solve the problem of conserving energy losses associated with a variable power factor in a variable reactive load. For example, U.S. Pat. No. 4,387,329 issued to Harlow discloses a Three Phase Power-Factor Control System For A.C. Induction Motors. The disclosed device uses a pulsed power-factor signal to control the on time of the power fed to a first-phase winding of an induction motor, and uses the signal indirectly to control the on time of the power fed to both a second-phase winding and a third-phase winding in the motor. The device discloses a plurality of control valves 14a, 14b, and 14c in FIG. 1 (comprising triacs 48, 50, and 52 shown in FIGS. 3 and 4) inserted in series in each power line of the three phase system. The power factor of the first phase winding is monitored, and a wave pulse power factor signal is used to control the on time of the power in the first, second, and third windings in the motor.

Harlow utilizes a switching device or control valve, such as a triac or silicon controlled rectifier (SCR), inserted in series with the variable load device, which has the disadvantage of causing the variable load device to cease functioning in the event of a failure in the series-connected switching device or control valve. Another disadvantage of using a series-connected switching device is that high levels of electromagnetic interference are injected into the system along with harmonic distortion on the power lines. Harmonic distortion increases the heat dissipation in the power lines, lowering the efficiency of the system and reducing component life-spans and reliability. A series-connected switching device also requires costly and time-consuming installation procedures and precautions. It is believed that all series-connected switching devices suffer the same disadvantages.

U.S. Pat. No. 4,723,104 issued to Rohatyn discloses an Energy Saving System For Larger Three Phase Induction Motors. This device employs series and preboost transformers, and includes variable transformers which are motor driven, some of which are connected in series in the power lines. These transformers are costly, and it is implicit in the disclosure that this scheme is cost effective mostly for loads utilizing very large quantities of power. The reference does not indicate the advantages of using (non-linear) switching devices to provide for power factor correction, but suggests the use of transformers operated continuously in the linear region of their hysteresis curve.

Therefore, it would be desirable to provide an apparatus for controlling a power factor in a variable reactive load, wherein a pulse-controlled reactive circuit is attached to the power lines of an AC motor or other variable reactive load, for correcting the power factor of the variable reactive load by storing the difference of the reactive and resistive energy components at a portion of the power cycle while energy is being returned to the power line by the variable reactive load and by pulsing that stored energy back to the power line when the variable reactive load is storing energy.

Similarly, it would be desirable to provide an apparatus having the advantages of effecting near-instantaneous power factor correction which is substantially continuous and precise for widely varying reactive loads, without substantial overcorrection, and of correcting harmonic disturbances and other undesirable high frequency resonances associated with a variable reactive load.

SUMMARY OF THE INVENTION

Accordingly, in one broad aspect the present invention provides an apparatus for controlling a power factor in a variable load, wherein a pulse-controlled reactive circuit is attached to the power lines of an AC motor or other variable reactive load, for correcting the power factor of the variable reactive load by storing the difference of the reactive and resistive energy components at a portion of the power cycle while energy is being returned to the power line by the variable reactive load and by pulsing that stored energy back to the power line when the variable reactive load is storing energy.

An object of the present invention is to provide an apparatus having the advantages of effecting near-instantaneous power factor correction which is substantially continuous and precise for widely varying reactive loads, without substantial overcorrection, and of correcting harmonic disturbances and other undesirable high frequency resonances associated with a variable reactive load.

Another object of the present invention is to provide an apparatus which can be used at various stages of an alternating current power distribution network to correct a power factor at relatively high voltages, at medium voltages, and at relatively low voltages.

A still further object of the present invention is to provide an apparatus which is cost effective for use with variable reactive loads drawing a relatively low amount of power, and similarly for use with a single variable reactive load or with a plurality of variable reactive loads connected in substantially any manner and configuration to the power lines.

Another object of the present invention is to provide an apparatus for correcting the power factor of a variable reactive load in a power distribution system containing any number of phases of electrical power.

A still further object of the present invention is to provide an apparatus which uses relatively inexpensive and low value components which are small in size, substantially reducing installment and replacement costs in a power factor correction device.

A still further object of the present invention is to provide an apparatus which can be easily installed without the need to break the power line connection to a variable reactive load which is to be controlled.

A still further object of the present invention is to provide an apparatus having a modular expansion capability to economically and flexibly accommodate various systems in which power factor correction of a variable reactive load is desired.

In accordance with a broad aspect of the present invention, a microprocessor is coupled to sense the current and voltage at a high sampling rate such as two hundred fifty-five (255) times per cycle, and to concurrently determine the power factor. The primary of a transformer is coupled across the power lines, and at least two capacitors, forming separate switching paths, are coupled to the secondary of the transformer. High speed switching circuitry under the control of the microprocessor alternately charges and discharges the capacitors, at varying frequencies, to alternately store energy from the power lines when the variable load is returning energy to the power lines, and to supply the stored energy back to the power lines when the variable load is absorbing energy from the power lines. This corrects the power factor since the timing of the high speed switching circuitry is varied with the varying reactance of the load.

To provide the above-mentioned and numerous other objects and advantages a high speed power factor controller in accord with the present invention preferably comprises a pulse reactor circuit connected to a single phase power line comprising a transformer having a first winding and a second winding, a plurality of capacitors, a first plurality of switching devices, responsive to switching pulses, coupling the capacitors across the second winding and a second plurality of switching devices, responsive to switching pulses, coupling the first winding across first and second power lines, and pulsing means for switching energy between magnetic and electric fields in the capacitors and the windings.

In an alternative preferred embodiment the above-described pulse reactor circuit also preferably includes measuring and control circuitry, comprising a voltage sensor having an input coupled to a first and second power line, a current sensor having an input coupled to the first or second power lines, a processor accepting an input from an output of said voltage sensor and said current sensor, providing as output a first, second, third and fourth switching output, a transformer having a first winding and a second winding, a first switch having an input coupled to the first switching output and having an output coupled in series with said first winding forming a first switching path, the first switching path being disposed across a phase of the power lines, a second switch having an input coupled to the second switching output and having an output coupled in series with the first winding forming a second switching path, the second switching path being disposed across a same phase of the power lines, a first and second capacitor, a third switching device having an input coupled to said third switching output and having an output coupled in series with said first capacitor and said second winding forming a third switching path; and a fourth switching device having an input coupled to said fourth switching output and having an output coupled in series with said second capacitor and said second winding forming a fourth switching path; wherein a power factor associated with said first and second power lines is corrected by selectively switching energy between magnetic and electric forms in said capacitors and said windings.

In another alternative preferred embodiment of the present invention multiple pulse reactors may be connected in parallel to a single phase power line, forming a pulse reactor gang, to provide power factor correction to variable reactive loads requiring relatively large amounts of power. The use of pulse reactor gangs is preferably modular to facilitate economic matching of the power factor correction requirements of the given variable reactive load with the apparatus required to control that variable reactive load. Modularity further provides the advantages of economy and ease of maintenance.

In a still further alternative preferred embodiment of the present invention multiple pulse reactor gangs are preferably connected to multiple phases supplying power to a variable reactive load. Preferably, the measurement and processing circuitry can be kept to a minimum in such an embodiment by providing appropriate control circuitry for operating multiple measurement sensors and multiple pulse reactor gangs using a single processor.

BRIEF DESCRIPTION OF THE DRAWINGS

FIGS. 6(a) and (6b) show the derivation of pulse reactor switching quadrants, for a single phase, based on measured values of line voltage and line current.

DESCRIPTION OF THE PREFERRED EMBODIMENT

Figure 1:
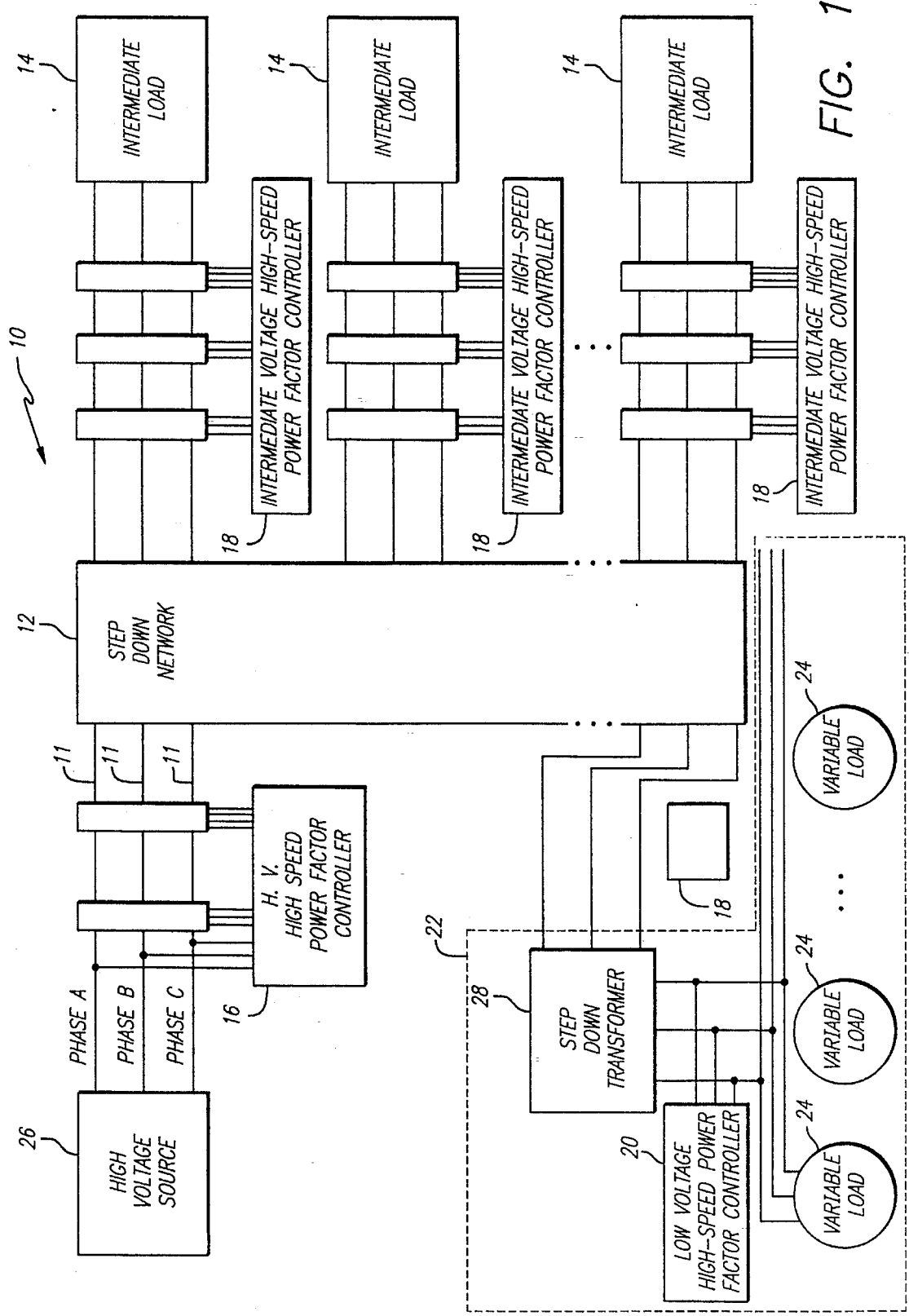
FIG. 1 is a block diagram showing three embodiments of the present invention for correcting the power factor at various stages of a power distribution network.

Referring to FIG. 1, three embodiments of a high-speed power factor controller 16, 18 and 20, in accord with the present invention, are shown in the context of an alternating current power distribution network 10. The distribution network 10 is depicted as a three-phase system. However, the present high-speed power factor controller 16, 18, 20 can be applied equally to two-phase or single-phase systems.

The three general embodiments of the present invention shown in FIG. 1 comprise high voltage high-speed power factor controller 16, intermediate voltage high-speed power factor controller 18, and low voltage high-speed power factor controller 20.

The alternating current power distribution network 10 includes high voltage source 26, step down network 12, a plurality of intermediate loads 14, and power distribution lines 11 connecting the various sources and the various loads. A typical intermediate load 22 is shown which further includes step down transformer 28 and a plurality of variable reactive load devices 24, which may be, for example, a series of motors operating walking beam oil pumps. Each stage in the power distribution network 10 may have a power factor associated with its respective load.

FIG. 1 clearly shows that a general preferred embodiment of the present high-speed power factor controller 16, 18, 20 can be attached to the three-phase power lines at virtually any stage of the alternating current phase power distribution network 10. For example high voltage high-speed power factor controller 16 connects between high voltage source 26 and step down network 12. Similarly, intermediate voltage high-speed power factor controller 18 connects to the three-phase power lines between step down network 12 and intermediate load 14. Low voltage high-speed power factor controller 20 connects to the three-phase power lines between step down transformer 28 and a plurality of variable load devices 24. Of course, the load devices 24 are merely illustrative of one type of load. One skilled in the art, given the teaching of the present invention, would understand that the power factor of many different types of load devices may be controlled and corrected by the present invention. Similarly, many different load configurations would be susceptible to control by the present invention, including single load devices, load devices connected in series, load devices connected in parallel, and load devices connected in series-parallel configurations.

Each of the high-speed power factor controllers 16, 18, 20, is capable of near instantaneous power factor correction of the three-phase power distribution lines 11 to which it is attached. Although illustrated with respect to three-phase power, the present invention will work with any number of phases. Instantaneous power factor correction is furthermore possible over a significant range of load variation in the given stage of the distribution network 10. These two capabilities of the present high-speed power factor controller 16, 18, 20, represent significant advantages over any prior art device, and, it is believed, facilitate large power savings not attainable in the prior art. The following discussion illustrates how these advantages are obtained.

Figure 2:
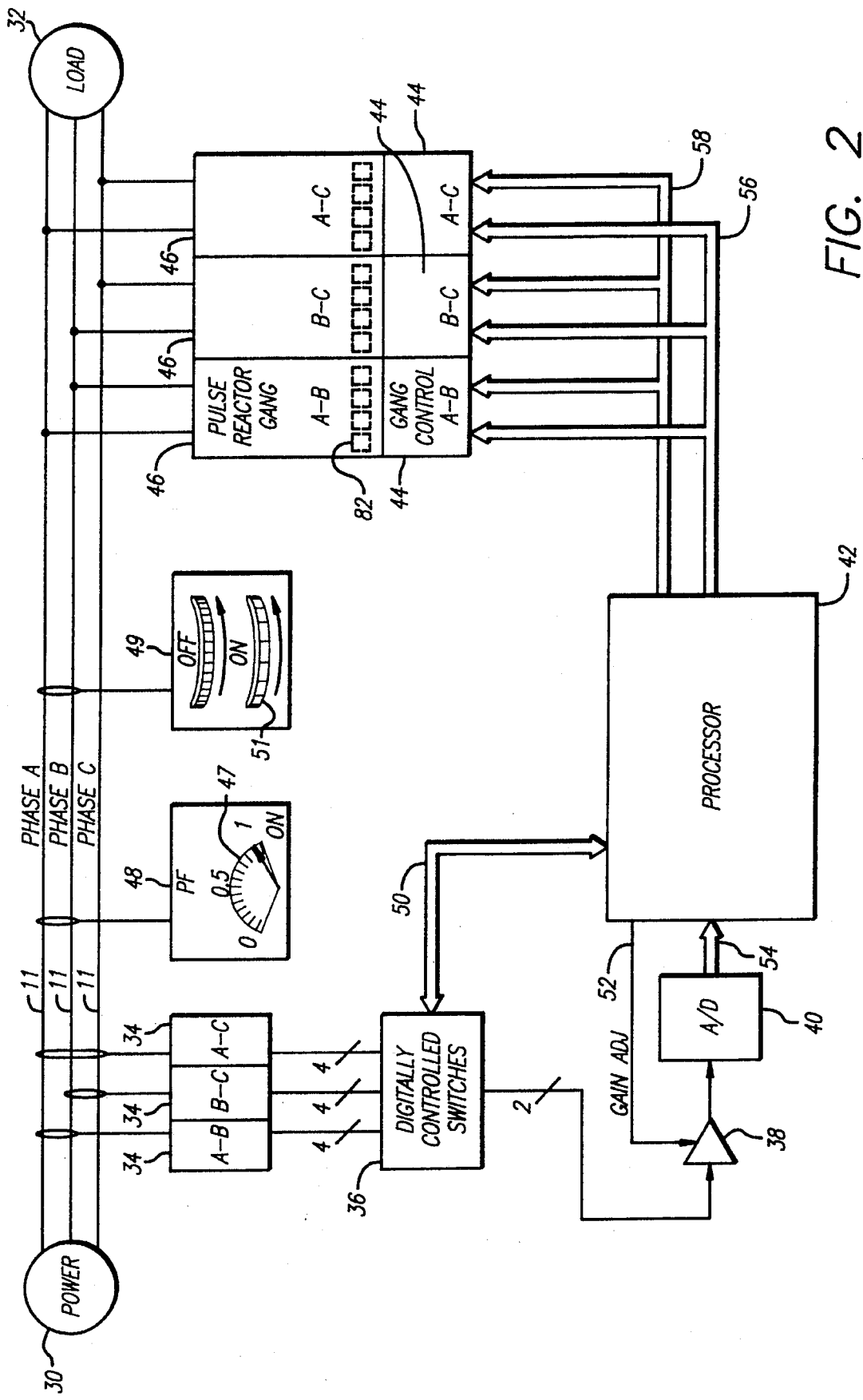
FIG. 2 is a block diagram of a generalized preferred embodiment of a power factor correction system illustrating the principles of the present invention.

Referring to FIG. 2, a block level illustration of a high speed power factor controller, 16, 18, 20, such as shown in FIG. 1, is shown. The high speed power factor controller is connected between three-phase power source 30 and variable reactive load 32. Three-phase power source 30 can be any device which supplies three-phase power as an output, such as high voltage source 26, step-down network 12, or step-down transformer 28, as shown in FIG. 1. One skilled in the art would appreciate the other possible sources of three-phase power. Similarly, load 32 is a generalized load representing any possible three-phase load in a power distribution network 10. The three phases are indicated in the conventional manner as phase A, phase B, and phase C. A line-to-line or line voltage A-B is associated with phase A and phase B. A line current A-B is also associated with phase A and phase B. Similarly, phases A and C, and phases B and C each have an associated line voltage and line current A-C and B-C. The line-pairs or phase-pairs, A-B, B-C, and A-C, are also commonly referred to as a first phase, a second phase, and a third phase of power.

Preferably, the high speed power factor controller comprises voltage and current sense circuitry 34 for measuring a line voltage or line current of each phase, switching circuitry 36 for selecting a phase line voltage or phase line current to be measured, adjustable gain amplifier 38 for adjusting the amplitude of the measured signal to be within an input range of analog-to-digital converter 40, analog-todigital converter 40 for converting a measured signal to a digital value at a given sampling interval, processor 42 for coordinating the activities of the high speed power factor controller under software program control, gang control unit 44 for each phase for controlling the path configuration and frequency of pulse reactor switching pulses, and pulse reactor gang unit 46 for each phase for adjusting the power factor of the phase in response to the pulse reactor switching pulses.

Measure select bus 50 connects the processor 42 to the switching circuitry 36 so that a line voltage or line current for a given phase can be presented to an input of adjustable gain amplifier 38 at a particular sampling interval. A gain adjust connection 52 allows processor 42 to control the gain of the adjustable gain amplifier 38, so that the amplifier provides an output signal within the conversion range of analog-to-digital converter 40. Measure data bus 54 connects the converted output of the analog-to-digital converter 40 to an input port of processor 42, either directly or indirectly.

Switching path control bus 56 connects a first output port of processor 42 to each gang control unit 44, allowing processor 42 to select and activate switching paths in pulse reactor circuits 82 (see FIG. 3) in a pulse reactor gang 46. Switching frequency control bus 58 connects a second output port of processor 42 to each gang control unit 44, so that the required frequency (duration) of switching pulses can be transferred to each gang control unit 44.

Figure 4A:
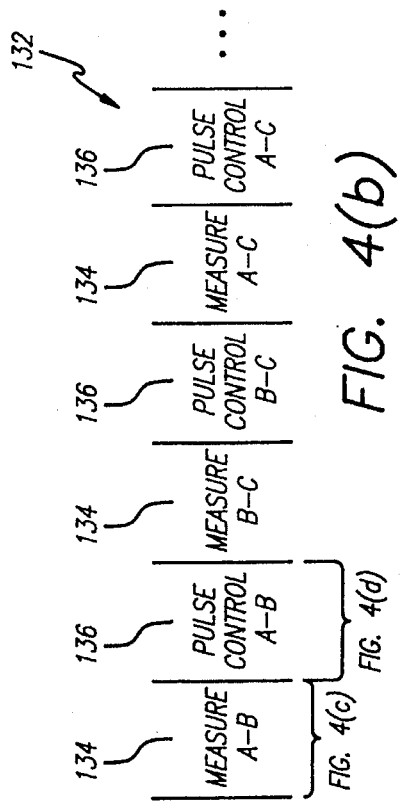
FIGS. 4(a)–(d) are a control timing diagram with expanded timing details showing the operation of the present high speed power factor controller under program control.

The configuration of the above-described preferred embodiment of the high speed power factor controller provides for the measurement and correction of a power factor for all three phases of power. Referring to FIG. 4(a), a representative diagram of balanced three-phase source line voltages 126, 128, 130 is shown. Hash-marks indicating a plurality of correction blocks 131 are also illustrated in the figure. A correction block 131 represents the measurement and correction operations performed by the high speed power factor controller for the three phases of power during a given sampling interval. Preferably, but not necessarily, high speed power factor controller implements two hundred fifty-five (255) correction blocks 131 during a single cycle of each phase of power.

Figure 4B:
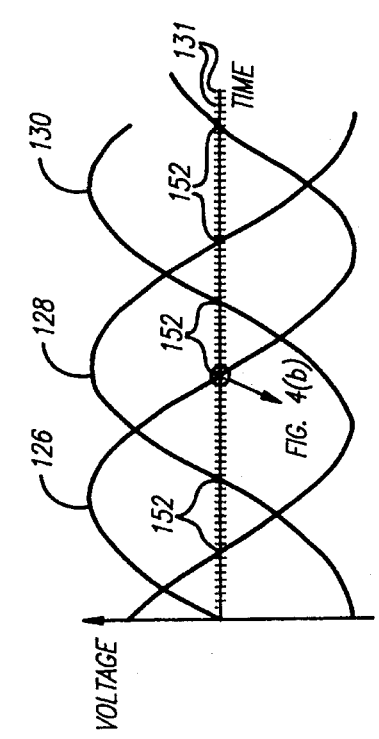

FIG. 4(b) shows a typical correction block 132, comprising typical measure routines 134 and typical pulse control routines 136 for each phase. During a measure routine 134, a phase line-voltage and a phase line-current are measured, converted, and stored. Calculations and comparisons are made by the processor 42 based on the converted values and on values saved during the previous half-cycle of the relevant power phase in order to provide switching path and switching frequency information. During the pulse control routines 136, the previously derived switching path and switching frequency information is provided to the respective gang control unit 44 for correcting the power factor using pulse reactor gang unit 46.

In short, the high speed power factor controller measures a line voltage and a line current for all three phase-pairs, and corrects a power factor in each phase-pair of power distribution lines 11 during each correction block 131, in a cyclic fashion.

Referring back to FIG. 2, one skilled in the art, in conjunction with the further description below, would appreciate that multiple circuit configurations may be used to implement the teaching of the present invention. Therefore, the present invention is not limited to the particular configurations depicted in FIGS. 2 and 3. For instance, one could utilize more than one processor 42, more than one gain adjustable amplifier 38, more than one analog-to-digital converter 40, to achieve the numerous advantages of the present invention without detracting from its inventive aspects. Similarly, the present apparatus may be easily adapted by one of ordinary skill in the art in light of the present disclosure, for use in any single or polyphase system for correcting a power factor in a multitude of variable reactive loads.

A standard power factor meter 48 and standard watt-hour meter 49 are shown in FIG. 2 connected to phase-pair A-B to illustrate the significant variation of the power factor in the power lines 11 without the present invention (off position) compared to the relatively high and steady power factor in the power lines 11 with the present invention (on position), despite a wide variation of the reactance of load 32. When the high speed power factor controller is off, the power factor meter 48 indicator 47 varies widely and has a much lower average value, while the watt-hour meter 49 wheel 51 rotates relatively quickly indicating the use of a relatively large amount of power. When the high speed power factor controller is turned on, the power factor meter 48 indicator 47 becomes relatively steady and approaches the value of 1 (one), while the watt-hour meter 49 wheel 51 rotates relatively slowly indicating the power savings.

A more detailed discussion of a preferred embodiment of a high speed power factor controller is presented with respect to a low voltage high speed power factor controller 20 as shown in FIG. 3. The details of phase A-B are shown and apply equally to the other phases. As indicated above, one skilled in the art would appreciate many other configurations capable of achieving the teachings of the preferred embodiment discussed here, however.

Figure 3A:
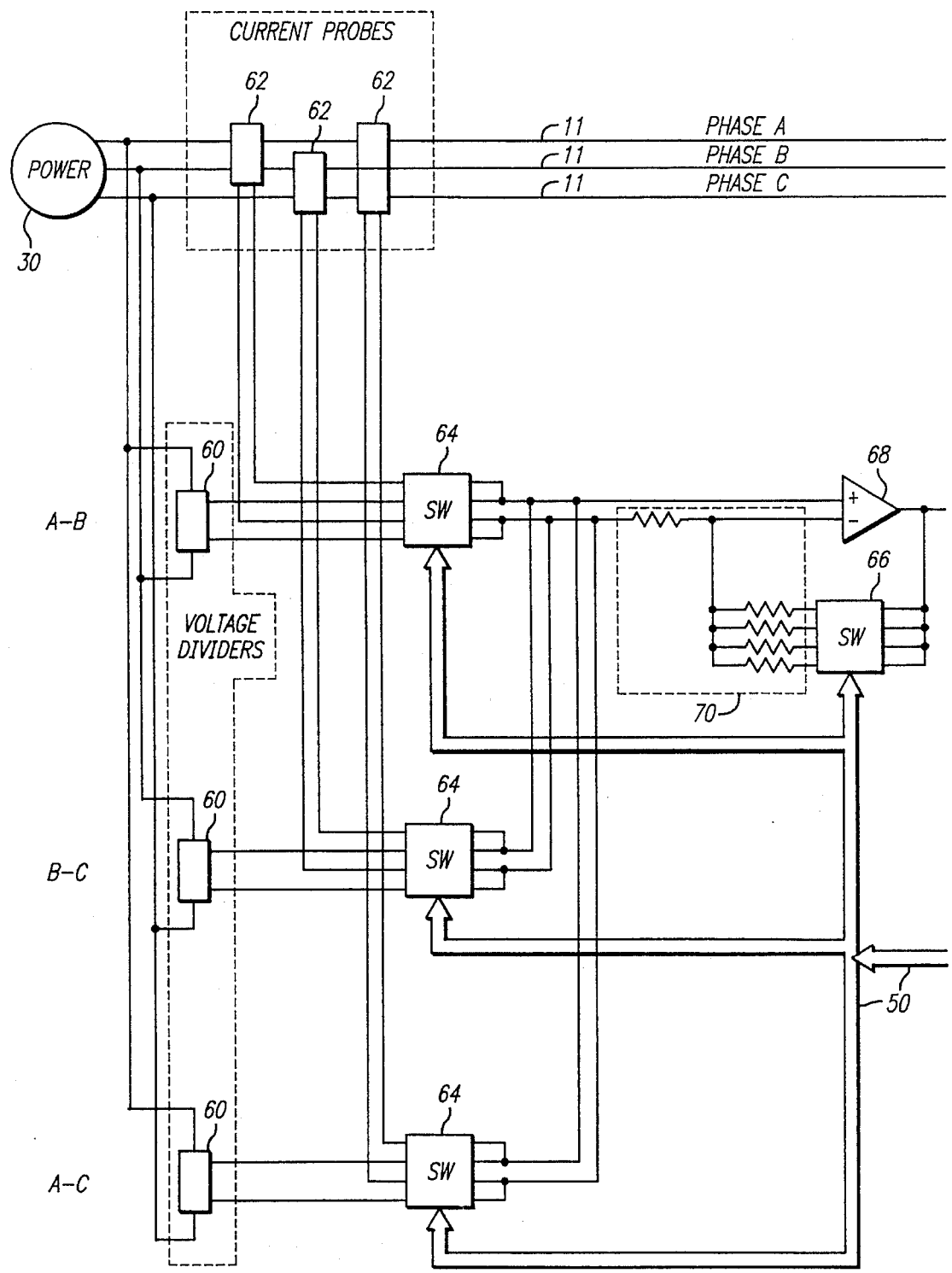
FIGS. 3(a)–(e) are a schematic diagram of a preferred embodiment of a high speed power factor controller.

Referring to FIG. 3(a), voltage and current sense circuitry 34 preferably, but not necessarily, comprise a voltage divider 60 and current probe 62 for each phase. Switching circuitry 36 preferably, but not necessarily, comprises a digitally controlled switch 64 for each phase. Adjustable gain amplifier 38 preferably, but not necessarily, includes op-amp 68, a digitally controlled switch 66 and resistor network 70. Digitally controlled switches 64 and 66 preferably comprise Harris model number HI-201s quad switches. Op-amp 68 preferably comprises Motorola model number OP-27.

Figure 3B:
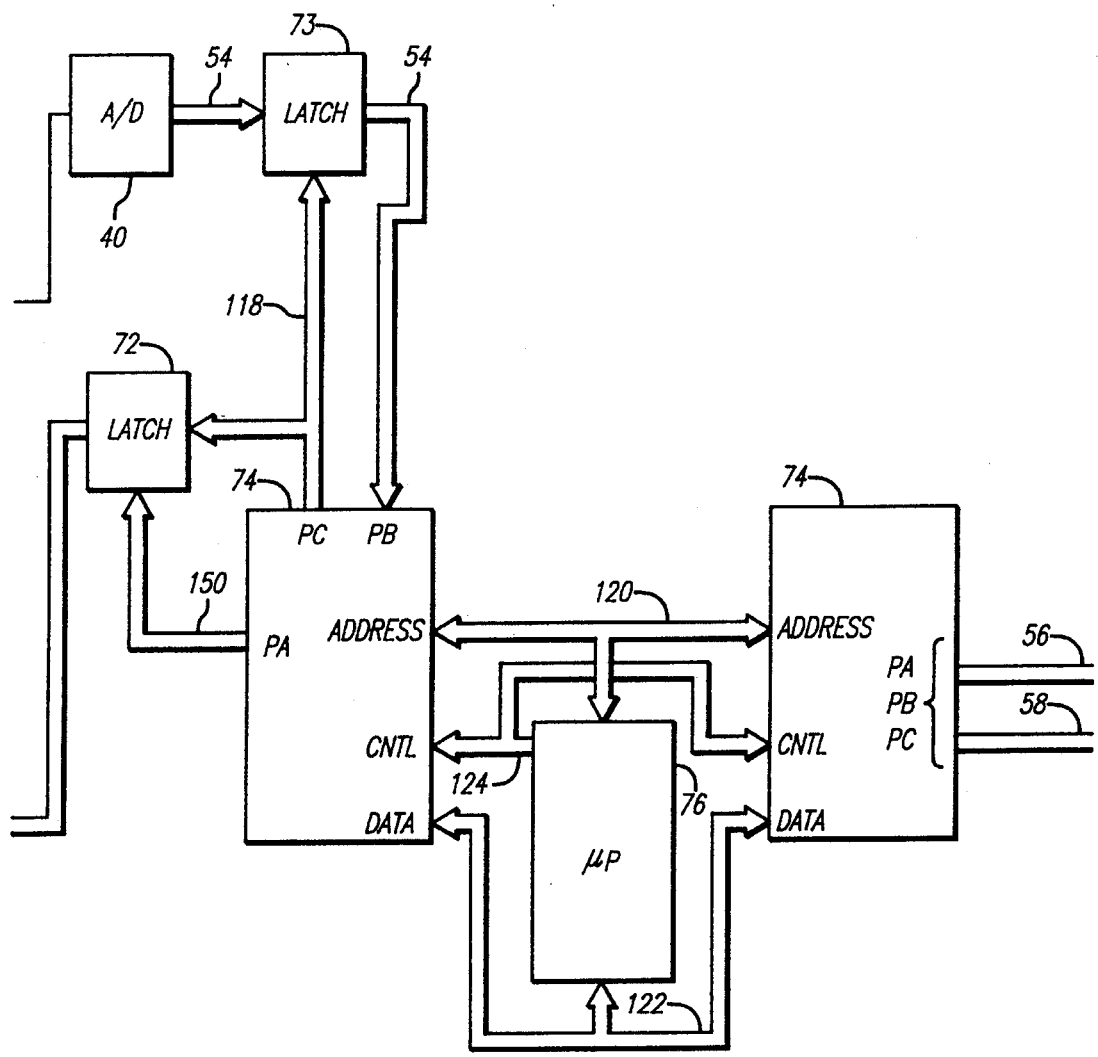

Referring to FIG. 3(b), processor 42 preferably, but not necessarily, comprises microprocessor 76 and peripheral interface devices 74, operatively connected to microprocessor 76 in a conventional manner. Latch 72 is inserted in the path of measure select bus 50. Latch 73 is inserted in the path of measure data bus 54. Microprocessor 76 preferably comprises Intel model number 80386-33, or similar device. Peripheral interface devices 74 preferably comprise Intel model number 8255 or equivalent devices. Latches 72 and 73 preferably comprise Motorola model number 74HCT573 octal 3 state latches. Analog-to-digital converter 40 is also shown, and preferably comprises Motorola model number CA0010C device.

Figure 3C:
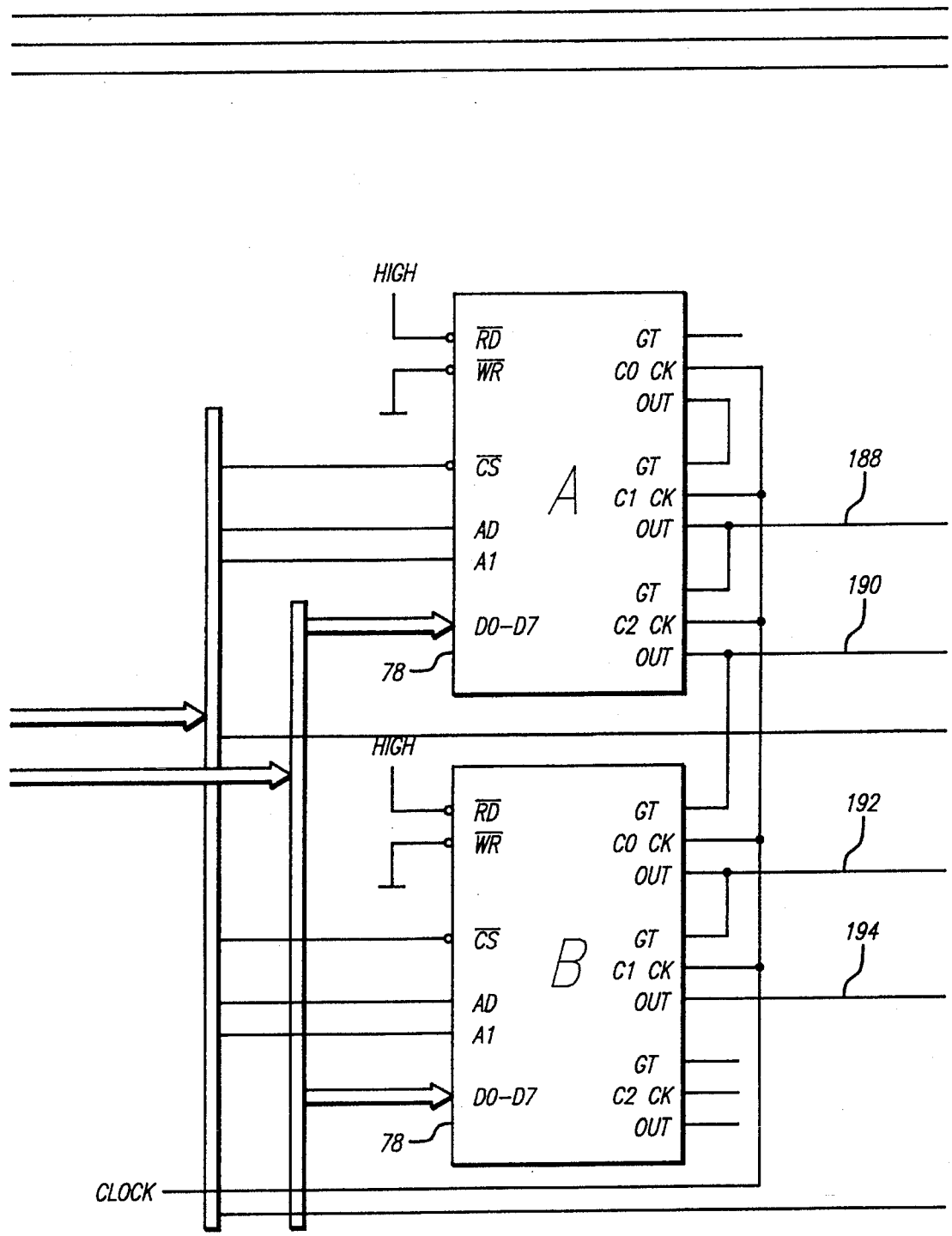
Figure 3D:
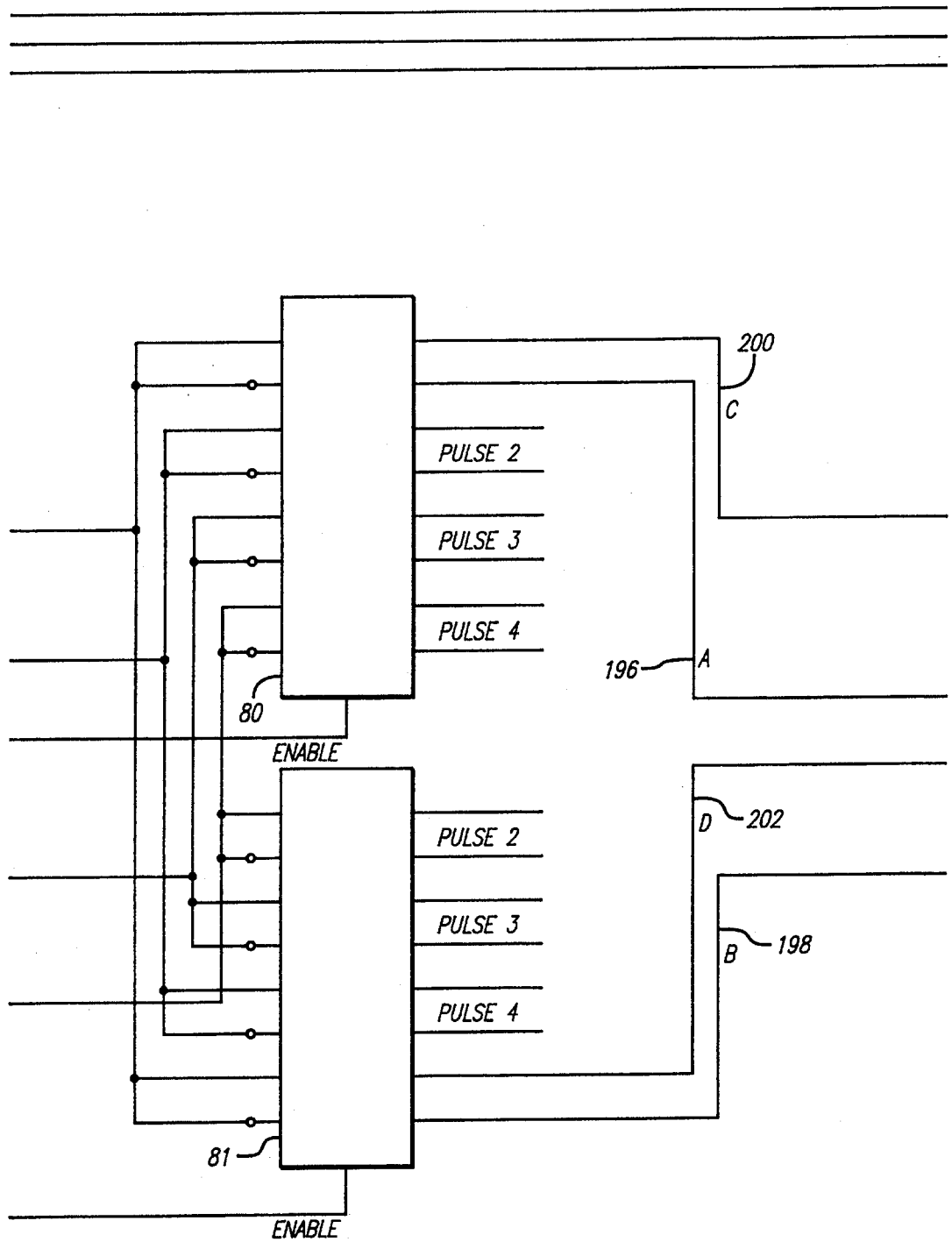
Figure 3E:
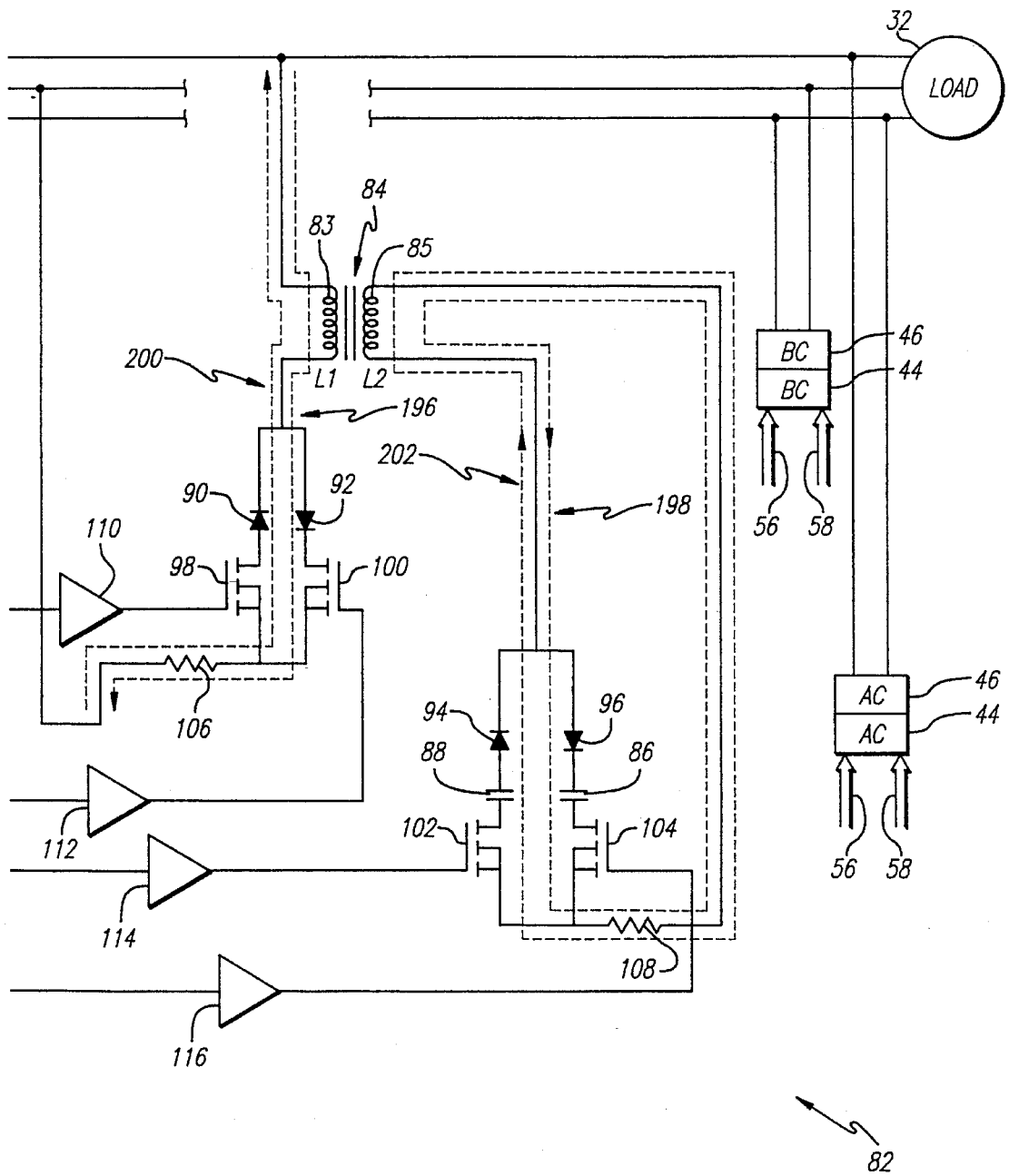

Referring to FIG. 3(c), each gang control unit 44 preferably comprises programmable counter/timers 78 and tri-state buffers 80 and 81. Programmable counter/timers 78 preferably comprise Intel model 8253 devices, while tri-state buffers 80 preferably comprise Motorola model HCT541 devices. Each pulse reactor gang unit 46 preferably comprises a plurality of pulse reactor circuits 82, which in turn each preferably comprise a transformer 84 having a first winding 83 and a second winding 85, storage capacitors 86 and 88, rectifiers 90, 92, 94, and 96, switching devices 98, 100, 102, and 104, resistors 106 and 108, and drive buffers 110, 112, 114, and 116. Switching paths 196, 198, 200, and 202 are also indicated in the figure.

Referring again to FIG. 3(a), voltage dividers 60 and current probes 62 are each operatively connected to one phase of power distribution lines 11, and receive an input signal therefrom. Each voltage divider 60 and current probe 62 provides a two terminal sensed output signal respectively proportional to a line voltage and a line current. The proportional voltage and current output signals are each in turn provided as input to respective digitally controlled switches 64, which contain four switches each.

Voltage dividers 60 are preferably resistors, but may comprise other suitable components for reducing the respective line-to-line voltage to a measurable level suitable for amplification by adjustable gain amplifier 38. Current probes are preferably inductive current probes but may comprise series resistors or other suitable components for detecting the respective line currents in power distribution lines 11 and for providing a sensed output signal suitable for amplification by adjustable gain amplifier 38.

Digitally controlled switches 64 and 66 operatively connect to setup latch 72 over the measure select bus 50, allowing the switches to be turned on or off in response to setup values contained in setup latch 72. The setup values are provided to latch 72 from first peripheral device 74, in response to signals from microprocessor 76, during a measurement routine 131.

This arrangement allows the sensed output signals from voltage dividers 60 and current probes 62 to be chosen or selected as input to the adjustable gain amplifier 38, in response to select information from microprocessor 76. The microprocessor 76 preferably, but not necessarily, sets the gain of adjustable gain amplifier 38 using a portion of the measure select bus 50 to adjust the resistance of resistor network 70, in a conventional manner, using digitally controlled switch 66. Thus, only one sensed voltage or one sensed current is selected at any given time to be amplified by adjustable gain amplifier 38 and converted to digital form by analog to digital converter 40.

Referring again to FIG. 3(b), analog to digital converter 40 may comprise any suitable standard device, such as Harris model number CA3310C. The analog to digital converter 40 accepts the currently setup line voltage or line current measurement as input and provides a digital output value, or converted value, representative of the measured value. The converted value is presented as input to measure latch 73, and is therefore accessible to microprocessor 76 via measure data bus 54. Measure control bus 118 preferably allows the microprocessor 76 to control the timing of voltage and current measurements by triggering latches 72 and 73, in a conventional manner, at an appropriate instant.

Microprocessor 76 preferably, but not necessarily, utilizes peripheral interface devices 74, in a conventional manner, to expand its input-output capabilities. Peripheral control bus 124 connects between microprocessor 76 and each peripheral interface device 74 to enable (activate) one or both chips at an appropriate time. Peripheral data bus 122 allows for the exchange of data between the microprocessor 76 and the peripheral control devices 74. Peripheral address bus 120 allows the microprocessor 76 to select an input or output port on either peripheral controller 74 for accepting or sending data over its respective data bus.

A first peripheral controller 74 accepts at a first input port the converted line voltage or line current value via measure data bus 54 from latch 73. First peripheral controller 74 also connects via a first output port to the latches 72 and 73 over measure control bus 118. Measure select bus 50 connects a second output port of the first peripheral controller 74 to an input of latch 72. Microprocessor 76 controls the flow of data into and out of the input and output ports of the first peripheral controller 74 in conventional fashion.

A second peripheral controller 74 has a first output port connected to switching path control bus 56, and has a second output port connected to switching frequency control bus 58. Microprocessor 76 controls the flow of data into the second peripheral controller 74 via peripheral data bus 122, and also controls the output of data onto the switching path control bus 56 and switching frequency control bus 58.

Referring to FIG. 3(c), each gang control unit 44 comprises a first and second programmable counter/timer 78, a positive channel tri-state buffer 80 and a negative channel tri-state buffer 81. First and second programmable counter/timers 78 each accept path and frequency inputs (at address and data ports, respectively) from switching path control bus 56 and from switching frequency control bus 58. Programmable counter/timers 78 generate four one-shot outputs, designated respectively as first, second, third and fourth reactor channels 188, 190, 192 and 194. Each reactor channel is input to digital buffers 80 and 81 so that each programmable counter/timer 78 provides each one-shot output at two input lines of each buffer 80 and 81. Preferably, but not necessarily, a reactor gang 46 comprises four pulse reactor circuits 82, and the above arrangement provides for each pulse reactor circuit 82 to be driven by respective input pulses from a reactor channel 188, 190, 192 and 194. FIG. 3(c) shows, with respect to a first pulse reactor circuit 82, that switching signals are applied to respective inputs of switching devices 98, 100, 102 and 104 to control the flow of current in four separate switching paths, 196, 198, 200 and 202, which are now described.

The connection for a single pulse reactor circuit 82, as shown in FIG. 3(c), is illustrative of the connection of the other pulse reactor circuits 82 in the pulse reactor gang unit 46. Two respective outputs of digital buffers 80 and 81, each pass the switching pulses provided on first reactor channel 188 in response to select signals, and are applied as input to each of drive buffers 110, 112, 114, and 116. The output of drive buffers 110, 112, 114, and 116 are in turn applied to each gate input of switching devices 98, 100, 102, and 104, respectively. The switching devices provide an output resistance in response to switching pulses of varying frequency received from the drive buffer outputs. In FIG. 3(c), the switching devices preferably comprise field-effect transistors. However, other devices, such as bipolar transistors, could be used. Each switching device is inserted in a series path of the pulse reactor circuit 82 and controls the current flow within that path.

In describing the switching paths for a first pulse reactor circuit 82 as an example, note that a first lead of the first winding 83 of transformer 84 connects to power distribution lines 11 at phase A, while a first lead of resistor 106 connects to power distribution lines 11 at phase B, and that two series switching paths 196 and 198 are formed using switching devices 100 and 98, respectively.

A first switching path 196 is comprised of a first winding 83 of transformer 84, rectifier 92, the output series path of switching device 100, resistor 106, and a reactance within the variable load 32 connected between phase A and phase B of power distribution lines 11. A second switching path 198 is comprised of the second winding 85 of transformer 84, rectifier 96, capacitor 86, the output series path of switching device 104, and resistor 108, forming a series loop.

A third switching path 200 is comprised of a first winding 83 of transformer 84, rectifier 90, the output series path of switching device 98, resistor 106, and a reactance within the variable load 32 connected between phase A and phase B of power distribution lines 11. A fourth switching path 202 is comprised of the second winding 85 of transformer 84, rectifier 94, capacitor 88, the output series path of switching device 102, and resistor 108, forming a series loop.

In operation, high speed power factor controller 20 periodically samples (measures and converts) a line voltage and a line current for each phase and, based on calculations from the sampled values, switches appropriate paths in the pulse reactor circuits 82 at appropriate frequencies so as to correct a power factor in the respective phase.

Some typical waveforms are shown in FIG. 5 to facilitate a discussion of the operation of the present high speed power factor controller. FIG. 5(a) shows a typical line voltage 138 associated with a given phase, which may be non-sinusoidal due to various sources of noise and due to various load characteristics. FIG. 5(b) shows a typical line current 140 associated with a given phase which may also be non-sinusoidal, and which is out of phase with the line voltage in a variable manner when a variable reactive load is present, as indicated by a phase difference 204. The phase difference can be positive or negative, corresponding, respectively, to a leading or lagging power factor in the power phase.

Figure 5B:
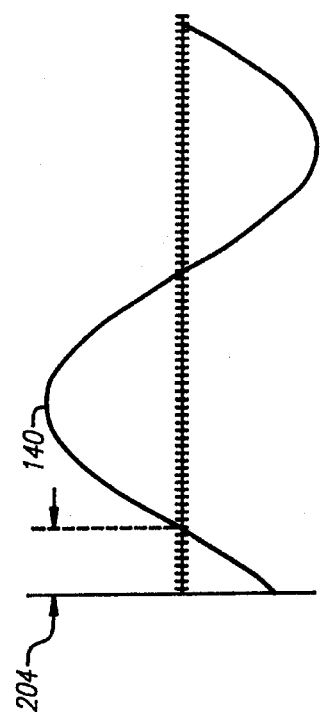
FIGS. 5(a)–(e) show an example of waveform analysis carried out by the present high speed power factor controller.
Figure 5E:
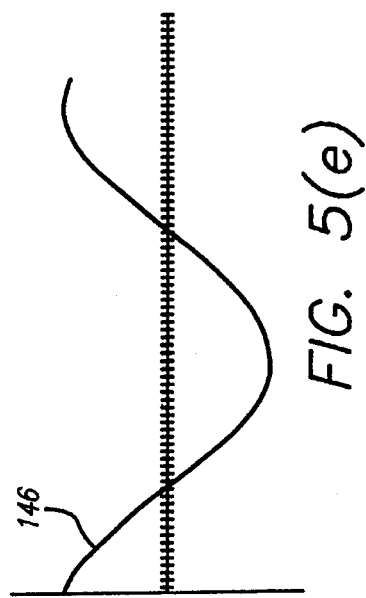
Figure 5C:
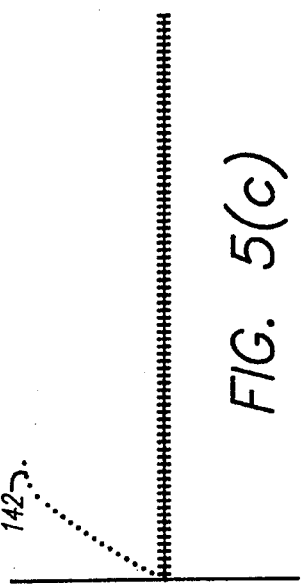
Figure 5A:
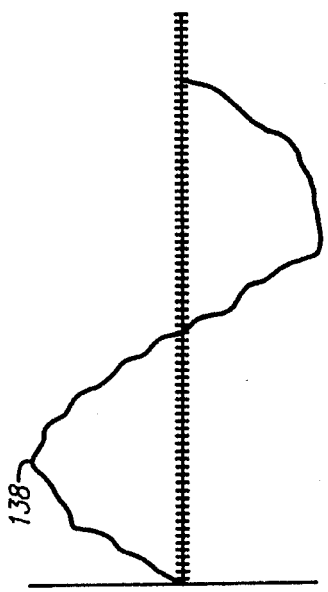

FIG. 5(c) shows a voltage template sequence 142 which is preferably, but not necessarily, stored in microprocessor 76. Voltage template values correspond to ideal, or desired, sinusoidal values at the given sample instant of the power cycle. Only a quarter-cycle template is stored since the remaining power cycle values can be derived by inverting and/or changing the order in which the template values are utilized.

Figure 5D:
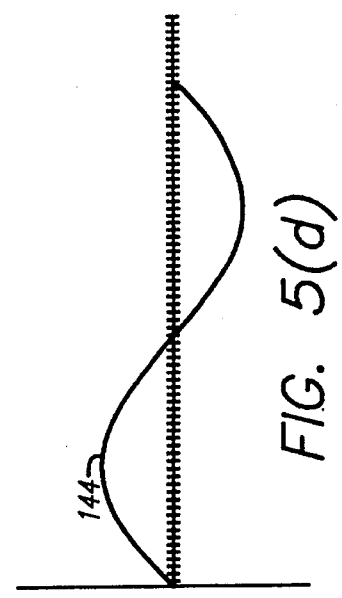

FIG. 5(d) shows a typical template error sequence 144 which is derived, under program control within the microprocessor 76, by dividing the respective voltage template sequence 142 values by the phase difference 204 detected during the previous half-cycle.

FIG. 5(e) shows a typical correction-frequency sequence 146 derived by adding the template error sequence 144 values to the respective present line current 140 values sampled during the present sampling interval.

Referring again to FIG. 4(a), waveforms representing ideal three-phase line voltages A-B, B-C, and A-C are shown respectively at 126, 128 and 130. This plot represents a balanced three-phase source. The time axis is broken up into correction block intervals 131. During a typical correction block 132 shown in FIG. 4(b), time is allocated for a typical measure routine 134 and a typical pulse control routine 136. Preferably, but not necessarily, a measure routine 134 is executed in a fixed-time window of approximately six and one-half microseconds (6.5 uSec), and a pulse control routine 136 is executed in a fixed time window of approximately sixty microseconds (60 uSec).

Preferably, but not necessarily, high speed power factor controller 20 provides for two hundred fifty-five (255) correction blocks 131 during a single power cycle of each phase of the three-phase power lines. One skilled in the art would understand, given the present disclosure, that the relevant time periods and operations discussed herein may vary significantly without departing from the scope or spirit of the present invention. For example, relevant time periods and operations could be adjusted to accommodate different microprocessor clock speeds or modifications in the circuit configuration such as referred to herein, or that would occur to one of ordinary skill in the art given the present disclosure.

Still referring to FIG. 4(b), typical correction block 132 includes three typical measure routines 134 and three typical pulse control routines 136, one for each phase. During a typical measure routine 134, a line voltage and a line current are sampled for the respective phase. Calculations are made based on these values as well as particular values measured, stored, or calculated during the previous half-cycle, to determine both a switching quadrant 206, 208, 210 or 212, as shown in FIG. 6, and a correction-frequency value for the phase, as described below. During a typical pulse control routine 136, the pulse reactor circuits 82 are switched in an appropriate switching quadrant 206, 208, 210 or 212 at an appropriate frequency based on the determinations made during the respective measure routine 134.

In operation, high speed power factor controller 20 may be considered to have three modes of operation, based on a reset, or referencing mode, a referencing-correction mode, and a normal correction mode.

High speed power factor controller 20 has a power-up/reset routine which is implemented through a conventional interrupt procedure. The routine causes the program in microprocessor 76 to go into a phase-referencing mode, in which it invokes a modified reset-correction block 131. During the modified reset-correction blocks 131, each measure routine 134 attempts to detect a line voltage zero-crossing 152. Until a line voltage zero-crossing 152 is detected for a given phase, no activity occurs in the respective pulse control routine 136. The program continues cycling to a next reset-correction block 131 until a zero-crossing 152 is detected for one of the three line voltages, 126, 128, of 130.

Once a zero-crossing 152 is detected for a particular line voltage 126, 128 or 130, a phase-counter is reset for the detected phase. Once reset, the phase-counter is updated during each occurrence of a correction block 131, and keeps track of the present phase (sample time) of the values obtained in the present correction block 131. Each power phase has its own phase-counter. After the appropriate phase-counter is reset, a modified referencing- correction block 131 is entered, in which pulse control routine 136 is invoked for the phases in which a zero-crossing 152 has been detected, that is, power factor correction occurs for referenced phases. Also during modified referencing-correction blocks the measure routine 134 for non-referenced phases is still used to detect a zero-crossing 152, while measure routine 134 for referenced phases is used for typical power-factor calculation purposes, as described below.

An ordinary correction mode is entered once all three phases have been phase-referenced. In this mode, the program for high speed power factor controller 20 simply cycles through correction blocks 131, preferably, but not necessarily, two hundred fifty-five (255) times for each power cycle in conjunction with a phase-counter for each phase.

Figure 4C:
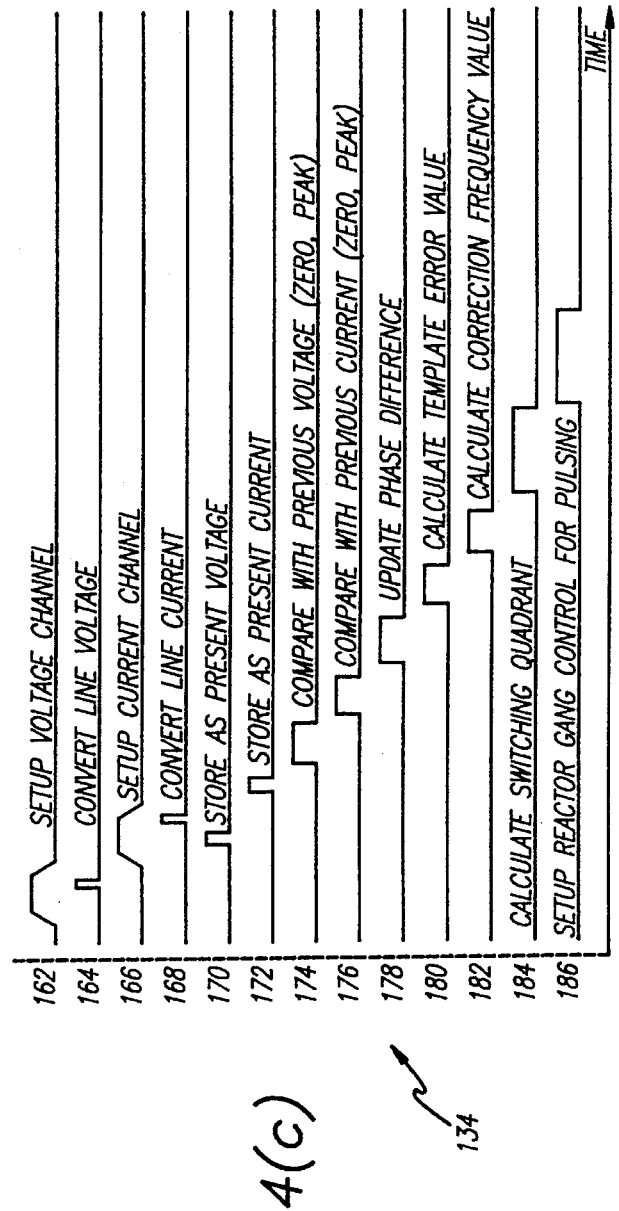

Referring to FIG. 4(c), typical phase measure routine 134 is shown. First, the program in microprocessor 76 sets up a voltage channel 162 by latching setup data into setup latch 72. This selects a sensed phase line voltage to be passed through digitally controlled switches 64 and to be presented as input to gain controlled amplifier 38. The gain adjustment is also set using data sent to setup latch 72 during the voltage channel setup operation 162.

Next, the selected line voltage is converted to a digital value by analog-to-digital converter 40 and is latched into measurement latch 73 during a voltage conversion operation 164.

The converted, or measured, line voltage is made available on measure data bus 54 and is stored in a present voltage location in microprocessor 76 during store present voltage operation 170.

Similarly, a line current measurement is obtained by setup operation 166, converted in conversion operation 168, and stored during storage operation 172.

Next, a voltage comparison operation 174 and a current comparison operation 176 are performed. Each comparison entails a determination of whether the presently stored variable (line voltage or line current) represents a peak value (positive or negative) for the present half-power cycle, and also whether the presently stored variable represents a zero-crossing in the power cycle. The comparison is made with respect to a previously stored voltage or current, as the case may be, for peak determinations. The comparison for zero-crossing determinations is to an acceptable, preset tolerance value.

Recall that a phase-counter is set when a line voltage equalling zero is first detected for a given phase during power-up/reset mode. Similarly, it is possible to reset the phase-counter on every second detection of a line voltage zero-crossing. Alternatively, the phase-counter simply restarts (resets) after 255 correction blocks 131 have been executed subsequent to the phase-counter being reset. The phase counter keeps track of the phase (time) at which a correction block 131 occurs within the power cycle.

Once detected in the above comparison, peak line voltage values, peak line current values, zero line voltage values, and zero line current values, are stored for each half-cycle, along with the respective value in the phase-counter which indicates the phase at which the values occurred.

Next, during update phase difference operation 178, a phase-difference 204 (FIG. 5(*b*)) for the present half cycle is calculated by taking the difference between the stored phase-counter values at the time a line voltage zero-crossing and a line current zero-crossing are detected. This phase difference 204 is stored for use during the next half cycle of the power.

Next, a template error calculation 180 is made, using a voltage sine template as illustrated by typical voltage template 142 as shown in FIG. 5(*c*). This is done in the following way. The voltage sine template 142 value corresponding to the phase interval presently being indicated by the phase counter is divided by the phase difference 204 which was calculated and stored during operation 178 of the previous half-cycle. This division operation results in the calculation of a respective template error value in the typical template error sequence 144 as shown in FIG. 5(*d*).

Next, a correction-frequency calculation 182 is made by adding the present converted line current 140 value to the present template error 144 value just calculated. This results in a correction-frequency value, such as shown in typical correction-frequency sequence 146 in FIG. 5 (*e*).

A switching quadrant calculation 184 is next executed, with reference to FIG. 6. For purposes of illustration, typical line voltage 138 is shown as sinusoidal. Typical line current 140 is shown as sinusoidal, and typical error sequence 144 is shown as if it were a continuous waveform.

First, the polarity of the present line voltage 138 is determined as being either positive of negative. This can be done by checking the present sampled line voltage value or by keeping track of the voltage phase as indicated in the phase-counter for the respective power phase.

First and second switching quadrants 206 (SQ1) and 208 (SQ2) occur when the line voltage is positive. If the present value of the template error 144 is less than the value of the presently sampled line current 140, the first switching quadrant 206 (SQ1) is operative. If the present value of the template error 144 is less than the value of the presently sampled line current 140, the second switching quadrant 208 (SQ2) is operative.

Third and fourth switching quadrants 210 (SQ3) and 212 (SQ4) occur when the line voltage is negative. If the present value of the template error 144 is greater than the value of the presently sampled line current 140, the third switching quadrant 210 (SQ3) is operative. If the present value of the template error 144 is greater than the value of the presently sampled line current 140, the fourth switching quadrant 212 (SQ4) is operative.

Finally, as a last step in typical measure routine 134, a reactor gang setup operation 186 is performed. During this operation, the microprocessor 76 provides information to an appropriate gang control unit 44 in anticipation of switching the pulse reactor circuits 82 in the appropriate pulse reactor gang 46. In particular, a switching path firing sequence is configured based on the presently derived switching quadrant information, by controlling the address/enable lines of programmable counter/timers 78 and tri-state buffers 80, 81, utilizing a sequence of values output over switching path control bus 56. Similarly, the frequency at which the switching paths 198, 200, 202 and 204 are fired is provided by outputting a value over switching frequency control bus 58.

Refer now to FIG. 6 for a discussion of the switching scheme for a single pulse reactor circuit 82. FIG. 6(*a*) shows a typical line voltage 138, a typical line current 140, and a continuous representation of a typical template error sequence 144. The variable reactive load 32 operates in one of two relevant modes at a particular phase of the power cycle. The variable reactive load 32 is either absorbing, or storing energy from the power lines or it is delivering, or returning energy back to the power lines, at a particular time (phase).

FIG. 6(*b*) shows a chart containing the switching path firing sequence information based on the four switching quadrants illustrated in FIG. 6(*a*). If the line voltage 138 is positive and the template error value 144 is greater than the present current value 140, then the first switching quadrant 206 (SQ1) is operational. This means that the variable reactive load 32 is storing energy from the power lines 11. The switching path value is determined so that the switching pulses, applied to each pulse reactor circuit 82 in the reactor gang 46, will first energize path 198, transferring electrical energy stored in capacitor 86 to magnetic energy in second winding 85 of transformer 84, and will then discharge path 196, providing electrical energy back to the power lines by converting the magnetic energy from the second winding 85 to a current in the first winding 83.

If the line voltage 138 is positive and the template error value 144 is less than the present current value 140, then the second switching quadrant 208 (SQ2) is operational. This means that the variable reactive load 32 is returning energy to the power lines 11. The switching path value is determined so that the switching pulses, applied to each pulse reactor circuit 82 in the reactor gang 46, will first energize path 196, transferring electrical energy from the power lines to magnetic energy in the first winding 83, and will then discharge path 198, converting the magnetic energy stored in first winding 83 to a current in second winding 85 which charges capacitor 86 and thus transfers the energy to an electrical field in capacitor 86.

If the line voltage 138 is negative and the template error value 144 is less than the present current value 140, then the third switching quadrant 210 (SQ3) is operational. This means that the variable reactive load 32 is returning energy to the power lines. The switching path value is determined so that the switching pulses, applied to each pulse reactor circuit 82 in the reactor gang 46, will first energize path 200, transferring electrical energy from the power lines to magnetic energy in the first winding 83, and will then discharge path 202, converting magnetic energy stored in first winding 83 to a current in second winding 85 which charges capacitor 88 and thus transfers the energy to an electrical field in capacitor 88.

If the line voltage 138 is negative and the template error value 144 is greater than the present current value 140, then the fourth switching quadrant 212 (SQ4) is operational. This means that the variable reactive load 32 is storing energy from the power lines 11. The switching path value is determined so that the switching pulses, applied to each pulse reactor circuit 82 in the reactor gang 46, will first energize path 202, transferring electrical energy stored in capacitor 88 to magnetic energy in second winding 85 of transformer 84, and will then discharge path 200, providing electrical energy back to the power lines 11 by converting the magnetic energy from the second winding 85 to a current in the first winding 83.

Figure 4D:
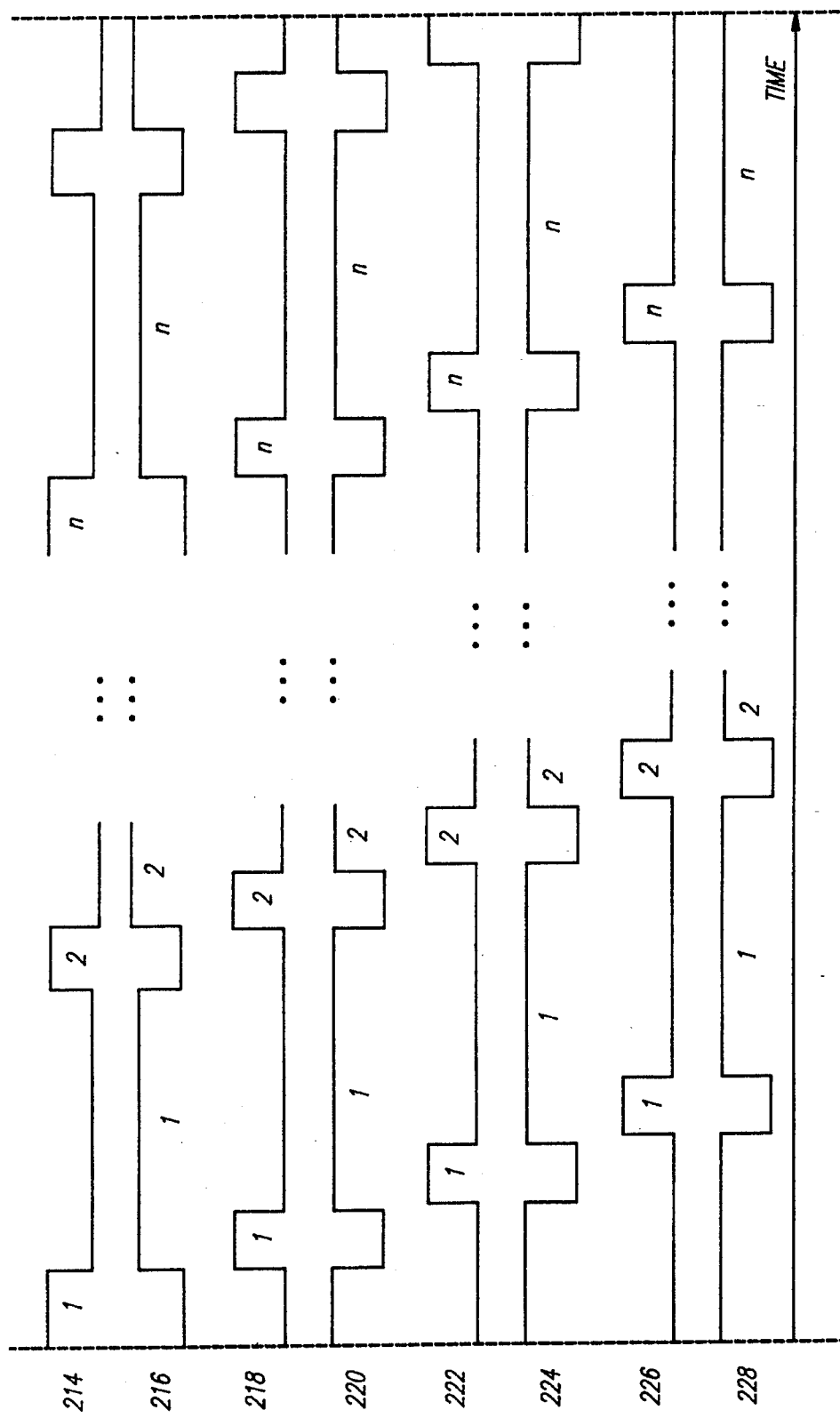

Referring to FIG. 4(d), typical pulse control routine 136 shows the switching pulses for a single reactor gang 46. Preferably, each reactor gang 46 includes four pulse reactor circuits 82. One of four sets of switching pulses respectively drives each pulse reactor circuit 82. A first set of switching pulses is provided over first reactor channel 188 and drives a first pulse reactor circuit 82. The switching pulses comprise an energize signal 214 and a discharge signal 216. A second set of switching pulses is provided over second reactor channel 190 and drives a second pulse reactor circuit 82. The switching pulses comprise an energize signal 218 and a discharge signal 220. A third set of switching pulses is provided over a third reactor channel 192 and drives a third pulse reactor circuit 82. The switching pulses comprise energize signal 222 and discharge signal 224. A fourth set of switching pulses is provided over fourth reactor channel 194 and drives a fourth pulse reactor circuit 82. The switching pulses comprise energize signal 226 and discharge signal 228.

The respective energize and discharge signals are each pulsed a number of times ("n" times) based on the correction-frequency value determined during measure routine 134. In general, when the phase-difference 204 (see FIG. 5(b)) is relatively large, indicating a low power factor value, the energize and discharge pulses will be of longer duration and fewer in number during the pulse control routine 136, that is, the pulses will have a low frequency. When the phase-difference 204 is relatively small, indicating a high power factor value, the energize and discharge pulses will be of shorter duration and greater in number during the pulse control routine 136, that is, the pulses will have a high frequency.

For example, when the phase difference 204 approaches 90 degrees leading or lagging, the number of pulses shown in FIG. 4(d) preferably approaches one (n= 1), and the duration of the pulses last substantially the entire width of the pulse control routine window, which is approximately sixty microseconds (60 uSec). Conversely, when the phase-difference 204 approaches zero, the number of pulses shown in FIG. 4(d) preferably approaches sixty (60), and the duration of the pulses is reduced proportionally so that all of the pulses fire within the sixty microsecond (60 uSec) time window.

Each energize pulse 214, 218, 222, 226, preferably, but not necessarily, lasts one-quarter to one-fifth as long as its respective discharge pulse 216, 220, 224, 228. Also, the pulses are arranged so that energize pulse 214 first switches one of the four switching paths of a first pulse reactor circuit 82 and discharge pulse 216 next switches a different one of the four switching paths of a first pulse reactor circuit 82. Energize pulse 218 switches one of the four switching paths of a second pulse reactor circuit 82 at the same time that discharge pulse 216 begins in the first pulse reactor circuit 82. Discharge pulse 220 immediately follows energize pulse 218, switching a different one of the four switching paths in the second pulse reactor circuit 82. This pattern continues for the third and fourth pulse reactor circuits 82, and the pattern repeats based on the number of times ("n") that each pulse reactor circuit 82 is to be switched.

The switching paths which are pulsed in each pulse reactor circuit 82, as described above, are chosen based on the switching quadrant information previously calculated during the measure routine 134. Referring to FIG. 6(b), the four switching quadrants SQ1, SQ2, SQ3 and SQ4 each invoke a particular switching configuration in all four pulse reactor circuits 82 in the reactor gang 46 of a given phase. For example, if the first switching quadrant 206 is determined to be operative during the relevant measure routine 134, then energize signal 214 is selectively applied to drive buffer 116 of a first pulse reactor circuit 82 during pulse control routine 136, and discharge signal 216 is selectively applied to drive buffer 112 of a first pulse reactor circuit 82 during pulse control routine 136. This means that switching path 198 is energized and switching path 196 is discharged. If the second switching quadrant 208 is determined to be operative during the relevant measure routine 134, then the switching configuration is reversed, so that switching path 196 is energized and switching path 198 is discharged. A similar relationship exists for switching paths 200 and 202 in the third and fourth switching quadrants 210 and 212, as indicated in FIG. 6(B). The corresponding switching paths in the remaining pulse reactor circuits 82 in the reactor gang 46 are driven by the remaining switching signals 218, 220, 222, 224, 226 and 228, as described above for the first pulse reactor circuit 82. That is, a corresponding path is energized and discharged in each pulse reactor circuit 82 in the reactor gang 46.

The pulsing of pulse reactor circuits 82, in the above manner, results in a relatively smooth correction of a power factor of a widely varying reactive load connected to the relevant power phase.

It should be noted that the terms "energize" and "discharge" are used merely for convenience, and do not necessarily indicate the specific function being performed by the various devices within any switching path.

An exemplary configuration for an intermediate voltage high speed power factor controller 18 is now considered. Transformer 84 is designed as a reactor coil, in a conventional manner, based on the relevant parameters of the power system for which power factor correction is required. For example, a 25 horsepower walking beam oil pump motor may operate from a 480 Volt (RMS) alternating current line and require 28 amps peak reactive current and a 15 kHz minimum switching rate at a 25% duty cycle in order to correct the power factor of the motor.

The toroid design of the transformer is chosen due to the ability of the torus to contain the magnetic field necessary to sustain the reactive current at the operating voltage.

Material selection for the transformer 84 core is based on the required operating frequency. The optimum frequency for a given material is generally provided for by the manufacturer of the core. The principal properties considered in the design of the transformer 84 windings 83, 85 are the ability of the core to contain a magnetic field proportional to the desired reactive current offset in the finished system. At the lowest extreme, the first or primary, winding 83 must be able to sustain a maximum current at the minimum voltage in order to offset the worst case current lag of the system. At the highest extreme, the transformer 84 must be designed to hold the magnetic field at maximum voltage and maximum current. The operating curve of the winding must also include the ability to respond to frequencies which allow storage of less energy than the two extremes, by variation of the applied switching frequency.

The winding must be able to store energy equivalent to the minimum voltage on the digital count of the waveform ($\sin(90/256) * 680$ vpk=4.17 v) times the maximum peak current (28 amps) times the 'ON' time of the winding switching path. This condition would require the longest amount of time to develop the required field, so that the slowest frequency (15 KHz) would be assigned to this condition. This is also where the inductance value can be determined. This storage condition yields about 1870 microjoules.

The value of the inductor forming first winding 83 can then be determined by the magnetic field energy relationship, as follows:

$L=(2*En)/I^2$; which, for the above values, yields approximately 5 microhenries.

The maximum amount of energy (En) in joules that the inductor is required to store can be determined by the peak reactive current (I), peak voltage (V), and the 'ON' time (t) of the inductor. By formula $En=V*I*t$.

The 'ON' time for the maximum condition is selected to yield a practical sized transformer 84 while allowing for space for the higher frequency operation of the coil to correct against smaller errors. At 50,000 microjoules, the operating frequency would be about 270 KHz. The maximum operating frequency of the digital timers 78 is about 2.4 MHz, so the low-to-high energy storage ratio at the peak could be somewhat less than 10 to 1.

Micrometals, Inc. manufactures a core capable of maintaining this inductance value under the calculated energy level at the desired frequencies, the T225-28. The $A_L$ of this core is 280 microhenries per 100 turns. To find the number of turns required to achieve the 5 microhenries, the formula Number of turns=sqrt[ Desired Inductance/(Inductance/100 Turns)]

is used, where "sqrt" means square root.

The example yields 13 turns. Assuming 500 circular mils per ampere on the wire and a 25% duty cycle, the current could safely be carried through a single #14 AWG wire. The secondary winding 85 could be wound at unity, or at a lower ratio to accommodate the use of capacitors 86, 88 and FETs 192, 104 of a lower voltage rating and higher current capacity.

To maximize energy storage in the core, the RL time constant is optimized around the lowest switching frequency of the system. The time constant formula for an L–R circuit is T=L/R, where L is the inductance and R is the resistance.

The slowest pulse width in the example system is 16.67 microseconds. To bring the inductor to the point that it stores 36% of the current flowing through it, one time constant is required. Thus the resistor 106 value is obtained by using the time constant formula: R=L/T=0.3 ohms for the present example.

The solid state switching requirements are determined in the following fashion. The device 98, 100 selected to switch the electromagnetic circuit on and off the line must be capable of withstanding the 680 peak volts of the circuit in its 'OFF' condition.

In the 'ON' condition the device selected needs to safely dissipate the power developed by its maximum drain-source resistance (RDS) in the ON state given the current flow through the R-L-switching path (switching path 196 or 200). Note that the drain-source voltage (VDS) will be negligible in the ON condition due to the selection of the switching frequencies such that most of the voltage is dropped across the winding 83.

Motorola manufactures the MTM6N80E field-effect transistor with an RDS ON of 1.2 ohms, a drain-to-source voltage rating of 800 volts, and a pulsed drain current rating of greater than 20 amps for the pulse widths specified in the example circuit.

With 20 amps flowing through the switching path 196, 200 at the slowest 'ON' time (and a 25% duty cycle) the power dissipation of the switch would be $I^2Rt$, or $20^2*1.2*.25=120$ watts. The package rating for this device is 150 watts, so, heat sinking would also be required. This completes the design requirements for the switched electromagnetic primary branches, namely switching paths 200 and 196.

Note that, in designing for horsepower loads as high as this one, P-channel field-effect transistors (FETs) which match the rating of the above mentioned N-Channel (Motorola MTM6N80E) device are often difficult to obtain. This difficulty can be overcome by winding a second primary winding exactly as the first, and connecting identical circuitry to the opposite ends of the second primary winding, and connecting the first and second primary winding ends, and the resistor associated with each primary winding, to opposite power lines. This configuration would serve the same function as switching paths 196 or 200.

The secondary switching paths 198, 202 are designed as follows. Considering the fairly high line voltage of the example circuit, it would be beneficial in the case of this example to step the secondary winding 85 down to provide for use of components with a lower voltage rating. If approximately 2:1 step down is used, the secondary wire gage would increase to 10 AWG with approximately half the turns of the primary winding 83, or, rounding off, 7 turns on the secondary winding 85. This causes the secondary voltage to be approximately half the primary voltage, and the secondary current to be approximately twice the primary current, as noted above. The Motorola MTM15N40E power FET meets these requirements.

The capacitors 86, 88 must be able to store the reactive energy of ¼ of a half cycle of 60 Hz reactive power because a capacitor is supplied for each of four reactor circuits 82 for each polarity of the voltage in the power lines 11. Also, the impedance of each capacitor needs to be low compared to the impedance of the transformer winding 85 to avoid resonance over the operating frequency range of the pulse reactor circuits 82.

The RMS energy of a half cycle of the example waveform would be 280 V*20 A*8.33 milliseconds, which is about 80 joules. This means that each capacitor needs to store one-quarter of the energy, or about 20 joules of energy per capacitor in a reactor gang 46 which includes four pulse reactor circuits 82.

Utilizing the 2:1 step-down ratio in transformer 84, the maximum RMS voltage is 240 V. Using the capacitive energy storage relationship, $C=2* E_n/V^2$ the capacitance value would be 2*20/57600 which equals approximately 694 microfarads for capacitors 86 and 88. Since the switching paths 198, 202, are designed to operate in polarized quadrants, aluminum electrolytic capacitors with low ESR, good high frequency characteristics, and a voltage rating of 400 VDC could be used for capacitors 86 and 88.

Although discussed with reference to a small number of preferred embodiments, the present invention is susceptible to numerous modifications by one of ordinary skill in the art based on the present disclosure. It is also noted that the present invention is applicable to variations which are not sinusoidal; thus, by way of example and not of limitation, the output from SCR control transistors wherein sine waves are modified, may be analyzed to determine phase difference, and the wave forms corrected is a manner comparable to that set forth hereinabove for sine waves. The present invention is therefore not limited to the particular details or embodiments disclosed above, but rather is covered by the following claims.

We claim:

1. A power factor correction system, comprising:

a voltage sensor having an input coupled across a first and second power line;

a current sensor having an input coupled to one of said first and second power lines;

a digital microprocessor;

circuitry for coupling signals from said voltage sensor to said microprocessor;

circuitry for coupling signals from said current sensor to said microprocessor;

said microprocessor including programming means for determining a phase difference between a sensed voltage and a sensed current, and providing first, second, third and fourth switching outputs responsive to said phase difference;

a transformer having a first winding and a second winding;

a first and second capacitor;

a first switching device having an input coupled to said first switching output and having a first output coupled in series with said first winding forming a first switching path, said first switching path being disposed across said power lines;

a second switching device having an input coupled to said second switching output and having a second output coupled in series with said first winding forming a second switching path, said second switching path being disposed across said power lines; a third switching device having an input coupled to said third switching output and having a third output coupled in series with said first capacitor and said second winding forming a third switching path; and a fourth switching device having an input coupled to said fourth switching output and having a fourth output coupled in series with said second capacitor and said second winding forming a fourth switching path;

wherein a power factor associated with said first and second power lines is corrected by selectively switching energy between magnetic and electric forms in said capacitors and said windings.

2. The system of claim 1, wherein said first and second switching paths further include a first resistor coupled in series with said first winding.

3. The system of claim 1, wherein said third and fourth switching paths further include a second resistor coupled in series with said second winding.

4. The system of claim 1, further including first, second, third, and fourth rectifiers respectively coupled in series with said first, second, third and fourth outputs.

5. The system of claim 1, wherein said voltage sensor coupling circuitry and said current sensor coupling circuitry comprise conversion circuitry disposed between said outputs of said voltage and current sensors and said inputs of said digital microprocessor.

6. The system of claim 5, wherein said conversion circuitry further comprises a plurality of digitally controlled switches having inputs coupled to respective outputs of said voltage sensors and said current sensors, and being responsive to select signals from said digital microprocessor;

an amplifier having an input coupled to the outputs of said digitally controlled switches; and an analog to digital converter having an input coupled to an output from said amplifier and an output coupled to an input of said digital microprocessor;

wherein said digital microprocessor controls the conversion of voltage and current and accepts the converted values.

7. The system of claim 6, wherein said amplifier further includes a gain control input coupled to an output of said digital microprocessor.

8. The system of claim 6, further including pulse generating circuitry disposed between an output of said digital microprocessor and said first, second, third and fourth switching device inputs, for generating switching pulses.

9. A power factor correction system, comprising:

a transformer having a first winding and a second winding;

a plurality of capacitors;

a first plurality of switching devices, responsive to switching pulses, coupling said capacitors across said second winding;

a second plurality of switching devices, responsive to switching pulses, coupling said first winding across first and second power lines; and means for correcting the power factor associated with said power lines by switching energy between magnetic and electric fields in said capacitors and said windings.

10. The system of claim 9, wherein said second plurality of switching devices are coupled in parallel with each other and are coupled in series with said first winding forming a plurality of switching paths through said winding and across said power lines.

11. The system of claim 9, wherein said first plurality of switching devices are coupled in parallel with each other and in series with respective ones of said plurality of capacitors forming a plurality of switching paths, said second winding being coupled in parallel with said plurality of switching paths.

12. The system of claim 9, further including a first resistor coupled in series with said first winding and a second resistor coupled in series with said second winding.

13. The system of claim 9, further including a first plurality of rectifiers coupled in series with said first plurality of switching devices and a second plurality of rectifiers coupled in series with said second plurality of switching devices.

14. The system of claim 9, further including voltage sense circuitry coupled across said power lines measuring a voltage across said power lines and current sense circuitry coupled to one of said power lines measuring a current in said power lines wherein said switching pulses are generated by said power factor correction means in response to said voltage and current measurements.

15. The system of claim 14, further including processing circuitry coupled to said voltage sense circuitry and said current sense circuitry, said processing circuitry determining a phase difference between said measured voltage and current and generating said switching pulses in response thereto.

16. The system of claim 9, wherein said first plurality of switching devices comprise a first and second switching device and said second plurality of switching device comprise a third and fourth switching device.

17. The system of claim 9, wherein said switching devices comprise field-effect transistors.

18. A power factor correction system comprising:
   at least one voltage sensor coupled to power lines;
   at least one current sensor coupled to said power lines;
   at least one analog to digital converter having an input coupled to respective outputs of said voltage sensor and said current sensor;
   digital processing circuitry, coupled to an output of said analog to digital converter;
   a first winding and a second winding being magnetically coupled;
   first and second capacitors;
   first and second resistors;
   first, second, third and fourth rectifiers; and
   first, second, third and fourth switching devices;
   said first winding coupled in series with said first rectifier, said first resistor, and an output of said first switching device, across said power lines;
   said first winding coupled in series with said second rectifier, said first resistor, and an output of said second switching device, across said power lines;
   said second winding coupled in series with said third rectifier, said second resistor, said first capacitor, and an output of said third switching device;
   said second winding coupled in series with said fourth rectifier, said second resistor, said second capacitor, and an output of said fourth switching device;
   said digital processing circuitry calculating a phase difference between a voltage and a current on said power lines and an operative switching quadrant, and for responsively pulsing the inputs to said first, second, third and fourth switching devices;
   said switching devices, in response to said pulses, alternately storing excess energy from said power lines in said capacitors and returning stored energy from said capacitors to said power lines.

19. The system of claim 18, further including pulse generating circuitry disposed between said switching device inputs and said programmable digital processing circuitry, said pulse generating circuitry providing a number of pulses to said switching devices in response to said phase difference calculation.

20. The system of claim 19, wherein the duration of said pulses is inversely proportional to said number of pulses.

21. A power factor correction system comprising:
   a microprocessor coupled to voltage sense circuitry and current sense circuitry;
   said voltage and current sense circuitry coupled to power lines;
   a primary of a transformer coupled to said power lines;
   at least two capacitors coupled to a secondary of said transformer, forming separate switching paths;
   switching circuitry coupled to said microprocessor, to said primary, and to said capacitors;
   said microprocessor determining a phase difference between a sensed voltage and a sensed current and responsively controlling said switching circuitry, alternately storing energy from said power lines in said capacitors and discharging energy from said capacitors to said power lines, correcting a power factor associated with said power lines.

22. The system of claim 21, wherein a frequency and a switching order of said switching circuitry are controlled by said microprocessor.

23. The system of claim 21, wherein
   said switching circuitry forms at least two switching paths in said primary and at least two switching paths in said secondary;
   said microprocessor calculates a switching quadrant based on said sensed voltage, said sensed current, and said phase difference, and responsively controls said switching circuitry to energize a first primary path or a first secondary path and to respectively discharge a second secondary path or a second primary path.

24. The system of claim 21 wherein said switching circuitry comprises transistors having inputs responsive to frequency generator outputs, said frequency generator responsive to inputs from said microprocessor.

25. A system as defined in claim 21 further comprising a motor operated under varying load conditions and having corresponding variable reactance, and power lines coupled to supply alternating current to said motor, said power factor correction system being coupled across said power lines.

* * * * *